US010414414B2

(12) United States Patent
Andre et al.

(10) Patent No.: US 10,414,414 B2
(45) Date of Patent: Sep. 17, 2019

(54) IMPACT DETECTION DEVICE FOR A SYSTEM FOR LOCKING THE KINGPIN OF A SEMITRAILER ON A RAILWAY UNIT

(71) Applicant: LOHR INDUSTRIE, Hangenbieten (FR)

(72) Inventors: Jean-Luc Andre, Molsheim (FR); Nicolas Kretz, Bernardswiller (FR); Jacques Ober, Strasbourg (FR)

(73) Assignee: LOHR INDUSTRIE, Hangenbieten (FR)

( * ) Notice: Subject to any disclaimer, the term of this patent is extended or adjusted under 35 U.S.C. 154(b) by 45 days.

(21) Appl. No.: 15/757,458

(22) PCT Filed: Jul. 1, 2016

(86) PCT No.: PCT/FR2016/051673
§ 371 (c)(1),
(2) Date: Mar. 5, 2018

(87) PCT Pub. No.: WO2017/046461
PCT Pub. Date: Mar. 23, 2017

(65) Prior Publication Data
US 2018/0257672 A1   Sep. 13, 2018

(30) Foreign Application Priority Data
Sep. 14, 2015   (FR) ...................... 15 58582

(51) Int. Cl.
*B60P 7/08* (2006.01)
*B61D 3/18* (2006.01)
(Continued)

(52) U.S. Cl.
CPC ................ *B61D 3/184* (2013.01); *B60P 3/06* (2013.01); *B60P 3/07* (2013.01); *B60P 3/073* (2013.01);
(Continued)

(58) Field of Classification Search
CPC .... B61D 3/184; B61D 45/005; B61D 45/004; B61D 3/182; B61D 3/16; B61D 3/18; B60P 3/06; B60P 3/073; B60P 3/07
(Continued)

(56) References Cited

U.S. PATENT DOCUMENTS 5,139,374 A * 8/1992 Holt ..................... B61D 45/005
410/64
2005/0191147 A1* 9/2005 Engle ....................... B60P 3/06
410/58

FOREIGN PATENT DOCUMENTS

EP   1813497 A1   8/2007
EP   1874607 B1   9/2008

OTHER PUBLICATIONS

International Search Report issued in PCT/FR2016/051673 dated Sep. 30, 2016.

* cited by examiner

*Primary Examiner* — Stephen T Gordon
(74) *Attorney, Agent, or Firm* — Marshall, Gerstein & Borun LLP

(57) ABSTRACT

An impact detection device for a system for locking the kingpin of a semitrailer on a railway unit includes a rigid connecting piece connected to a kingpin receiving structure and a connecting shaft connecting the rigid connecting piece to the railway unit, mounted on the railway unit, received with the ability to pivot in an oblong provided in the rigid connecting piece and capable of moving in the oblong. The device also includes a shear pin that prevents the connecting shaft from moving in the oblong and which breaks in the event of an impact so as to allow the connecting shaft to move in the oblong, a bypass pipe mounted as a bypass on the general pipe of the railway unit, and a cutoff tool secured to the railway unit, which cuts off the bypass pipe when the (Continued)

shear pin is broken and a connecting shaft is moving in the oblong.

16 Claims, 3 Drawing Sheets

(51) Int. Cl.
*B60P 3/06* (2006.01)
*B60P 3/07* (2006.01)
*B60P 3/073* (2006.01)
*B61D 3/16* (2006.01)
*B61D 45/00* (2006.01)
*B61D 47/00* (2006.01)

(52) U.S. Cl.
CPC ............... *B61D 3/16* (2013.01); *B61D 3/18* (2013.01); *B61D 3/182* (2013.01); *B61D 45/004* (2013.01); *B61D 45/005* (2013.01); *B61D 47/005* (2013.01)

(58) Field of Classification Search
USPC .................... 410/56–58, 61, 62, 64; 105/355
See application file for complete search history.

IMPACT DETECTION DEVICE FOR A SYSTEM FOR LOCKING THE KINGPIN OF A SEMITRAILER ON A RAILWAY UNIT

TECHNICAL FIELD

The present disclosure relates to the field of systems for locking the kingpin of a semi-trailer on a railway unit in devices for transporting semi-trailers by railroad.

The disclosure more particularly relates to an impact detection device making it possible to detect and generate an alarm if a railway unit transporting a semi-trailer experiences an impact that may damage the kingpin of the semi-trailer.

BACKGROUND

The kingpin of standardized semi-trailers is designed to engage removably on a fifth wheel carried by a towing vehicle in order to form a pivot link allowing semi-trailers to be moved by the towing vehicle associated therewith.

Patent EP 1,874,607, in the applicant's name, teaches a system for locking the kingpin of a semi-trailer on a railway unit wherein a cowling part is mounted, via a central opening, on the kingpin of the semi-trailers in order to be received in a receiving element, called nacelle, that is mounted on the railway unit. This nacelle is in particular intended to automatically center and lock the cowling part, and therefore the kingpin, when the cowling part is received within the nacelle. This nacelle is typically actuated by a lifting means allowing it to be moved vertically in order to receive the cowling part and the kingpin for maintaining and locking thereof.

In case of collision of the railway unit carrying the semi-trailer, or during other events, an abrupt impact may be transmitted to the kingpin by the locking system. While the locking system of the applicant satisfies railway standards, it is not damaged by such an impact, which may correspond to a force of several tens of tons. At the cowling part, however, this impact may damage the kingpin, since the latter satisfies road standards, which are less demanding than railway standards on this point.

Such damage to the kingpin is not easily detectable. Thus, after a violent impact during collision, a kingpin may be made fragile without this fragility being detected. Unaware of this fragility, the driver then unloads the semi-trailer from the railway unit to take it to its final destination by pulling it with his tractor vehicle. During this travel, the fragile kingpin may break, which may have drastic consequences.

There is therefore a need for an impact detection device that makes it possible to detect whether a railway unit carrying the semi-trailer has undergone an impact that could damage the kingpin. Such an impact detection device must advantageously be able to be calibrated to be triggered beyond a predetermined threshold.

According to operating requirements, this threshold may be modified to make it possible to detect smaller impacts, in particular out of a concern for protecting transported goods, or more importantly, for example in the case of different railway standards.

SUMMARY OF THE DISCLOSURE

The object of the presently disclosed embodiments is to resolve the aforementioned drawbacks by proposing an impact detection device for a system for locking the kingpin of a semi-trailer on a railway unit.

The disclosed embodiments are achieved using a railway unit on which a semi-trailer is intended to be loaded. This railway unit includes a system for locking the kingpin of said semi-trailer comprising a receiving structure provided to receive said kingpin. It also includes a general pipe for supplying fluid supplying and commanding in particular the brakes of the railway unit.

According to the embodiments, the railway unit further includes an impact detection device comprising the following means:
  a rigid connecting piece connected to the receiving structure, the impacts experienced by the receiving structure being transmitted to said rigid connecting piece;
  at least one connecting shaft by which the rigid connecting piece is connected to the railway unit, said connecting shaft being mounted on the railway unit, received pivoting in an oblong provided in the rigid connecting piece and able to move in the oblong over a limited travel D provided on each side in the oblong;
  at least one shear pin inserted through the connecting shaft and the oblong that prevents the connecting shaft from moving in the oblong, this shear pin being provided to break in case of impact exceeding a certain threshold and then allowing the connecting shaft to move in the oblong;
  at least one bypass pipe mounted as a bypass on the general pipe of the railway unit, this bypass pipe being secured to the rigid connecting piece;
  at least one cutoff tool secured to the railway unit, which cuts off a part of the bypass pipe when a shear pin is broken and a connecting shaft is moving in the oblong associated with it.

Operating without energy, the impact detection device is consequently satisfactory in terms of safety. Owing to the cutoff of part of the bypass pipe and the resulting fluid leak, users are advantageously alerted to the fact that a major impact has been experienced by a kingpin, such that the latter can be inspected in particular to determine whether the semi-trailer is usable as is.

According to one embodiment, the rigid connecting piece comprises arms connected to the receiving structure, each rigid arm further being connected to the railway unit by a connecting shaft mounted on the railway unit, this connecting shaft being received pivoting in an oblong provided in each rigid arm and able to move in this oblong over a limited travel D provided on either side in the oblong, and in that a shear pin is inserted through the oblong of each rigid arm and the connecting shaft that is associated with it.

According to this embodiment, each rigid arm can be associated with a shear pin, with a bypass pipe and with a cutoff tool that are separate from those of the other rigid arms.

According to another embodiment, each connecting shaft is horizontal and transverse relative to the railway unit, while the rigid connecting piece extends longitudinally relative to the railway unit.

According to one embodiment, the rigid connecting piece is mounted articulated on the receiving structure at the level of a first end.

According to another embodiment, the rigid connecting piece is mounted articulated on the railway unit at the level of a second end.

According to one embodiment, each shear pin is in the form of a threaded rod for example having weak zones provided to break in case of impact exceeding a certain threshold.

According to this embodiment, each shear pin may include a first circular weakening groove provided in the upper part of the oblong and a second circular weakening groove provided in the lower part of the oblong.

According to one example embodiment, each bypass pipe is a semi-rigid bypass pipe.

According to another embodiment, the part of each bypass pipe provided to be cut off is located in the immediate vicinity of an associated cutoff tool assuming the form of a guillotine having two blades provided one in front of and one behind the part of the bypass pipe to be cut off.

According to an additional embodiment, each cutoff tool comprises a plate having an opening for the passage of the part of the bypass pipe provided to be cut off, the vertical flanks of this opening being provided with a cutting element that cuts the bypass pipe when the rigid connecting piece moves longitudinally.

According to one embodiment, a bypass pipe and an associated cutoff tool are provided on each side of the part by which the rigid connecting piece is connected to the railway unit.

According to one embodiment, the impact detection device comprises an isolating tap making it possible to isolate the bypass pipe(s) with respect to the general pipe.

Thus, in particular in the preferred case where the users are alerted to the impact suffered by locking of the brakes of the railway unit, the impact detection device is reversible and thus makes it possible to unlock the brakes. Once actuated by a significant impact, the impact detection device does not prevent the operation of the system for locking a semi-trailer kingpin on a railway unit, or the unloading of the semi-trailer in question off the railway unit.

According to one embodiment, the rigid connecting piece includes a protecting device for the receiving structure. According to this embodiment, the protecting device comprises a tarp mounted pivoting and provided to be able to be pivoted over the receiving structure to cover it at least partially when no semi-trailer is loaded on the railway unit. Such a protection device in particular makes it possible to protect the receiving structure from bad weather.

BRIEF DESCRIPTION OF THE DRAWINGS

Other characteristics and advantages of the present embodiments will be seen more clearly from the following description, provided with reference to the appended drawings, provided by way of non-limiting examples, in which.

DETAILED DESCRIPTION

Figure 1:
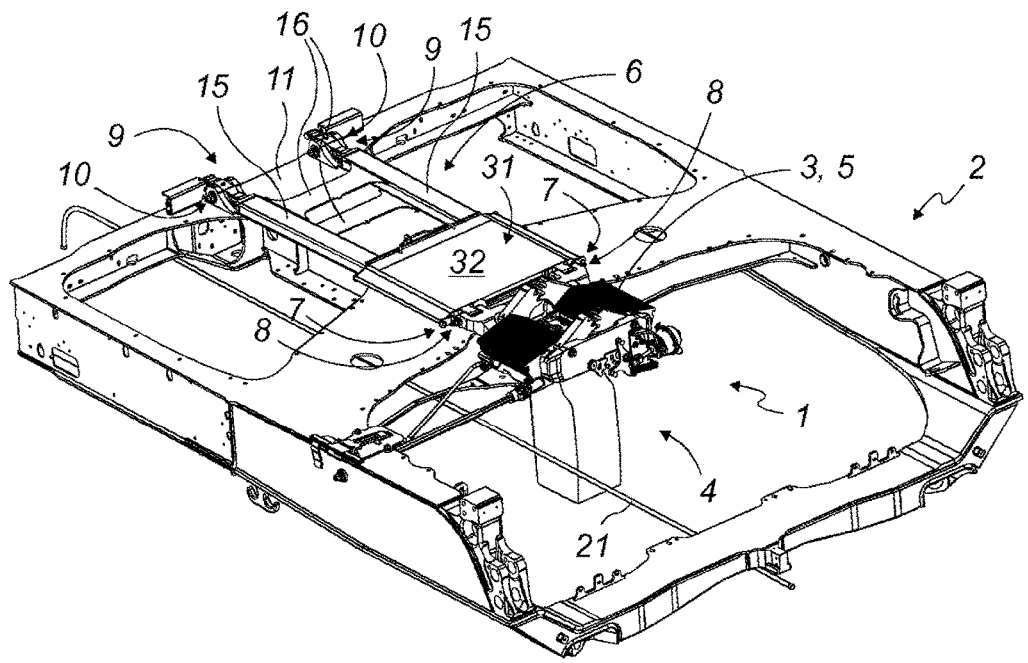
FIG. 1 is a front perspective view of part of a railway unit including a system for locking the kingpin of the semi-trailers as well as an impact detection device.
Figure 4:
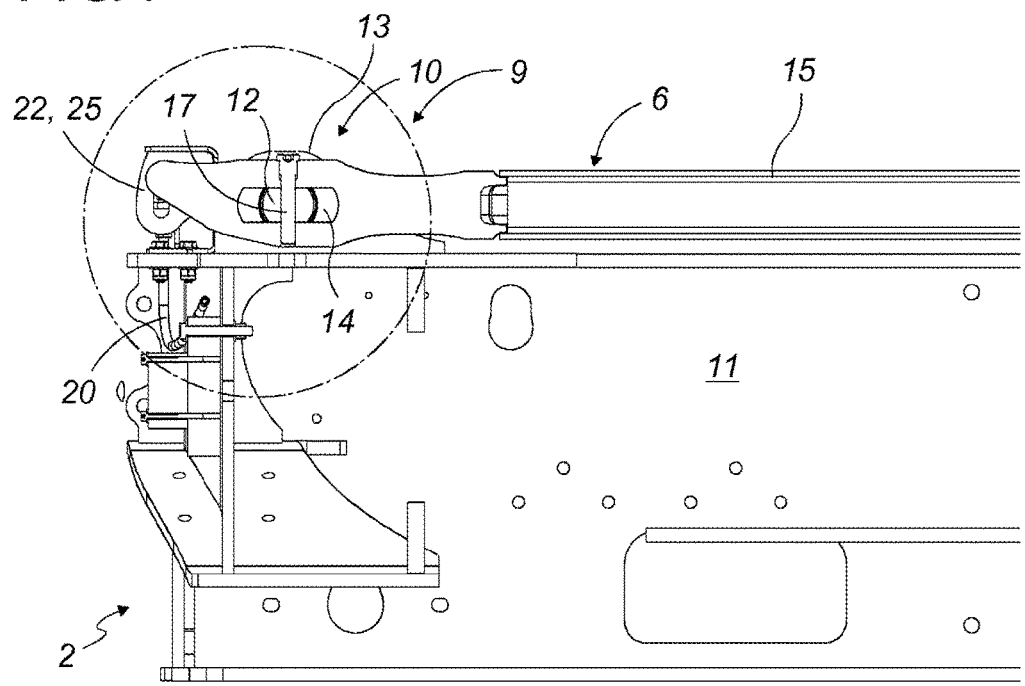
FIG. 4 is a vertical sectional view of the railway unit of FIG. 1 at the cutting axis shown in FIG. 3.
Figure 2:
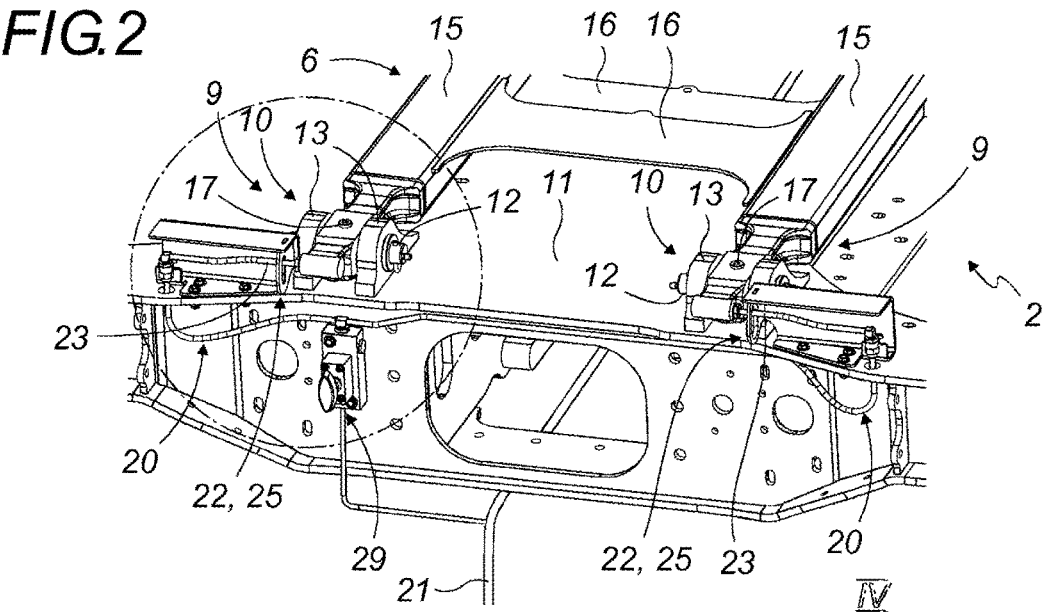
FIG. 2 is a rear perspective view of the railway unit of FIG. 1.
Figure 3:
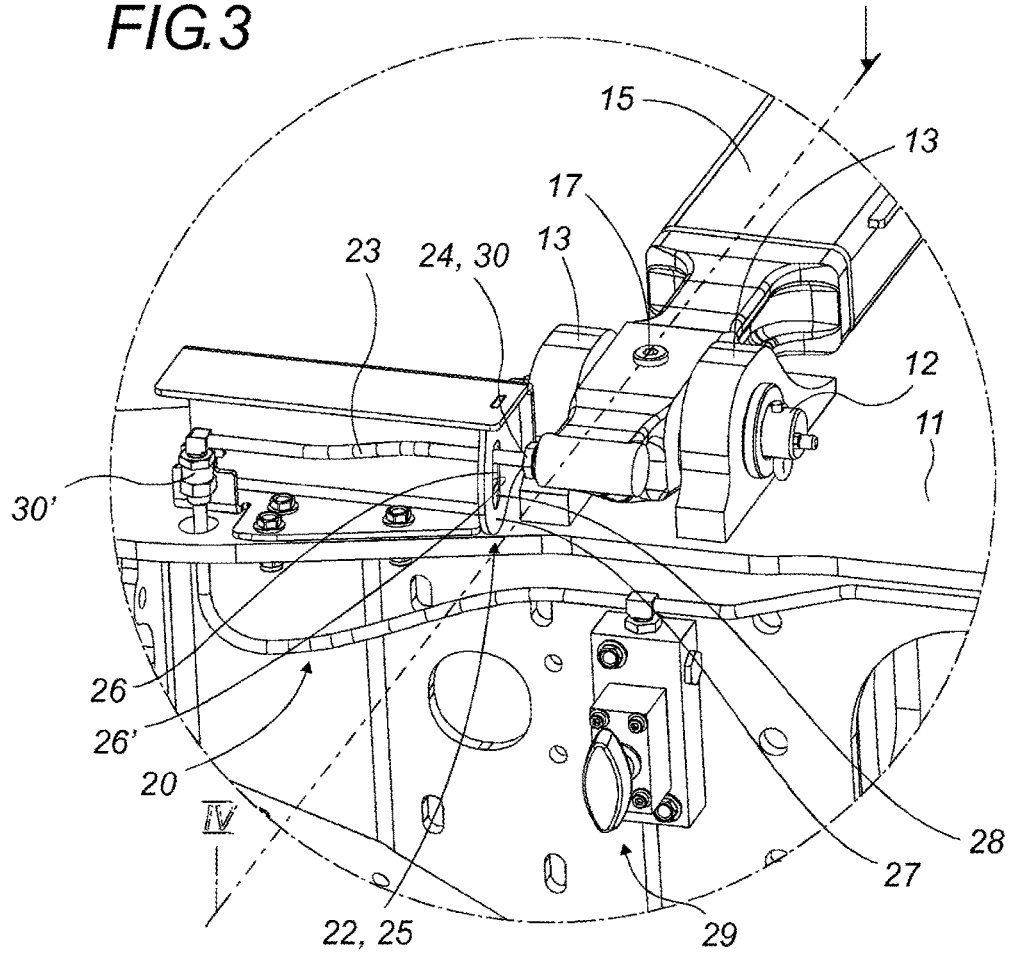
FIG. 3 is a detailed view of the circled portion in FIG. 2.
Figure 5:
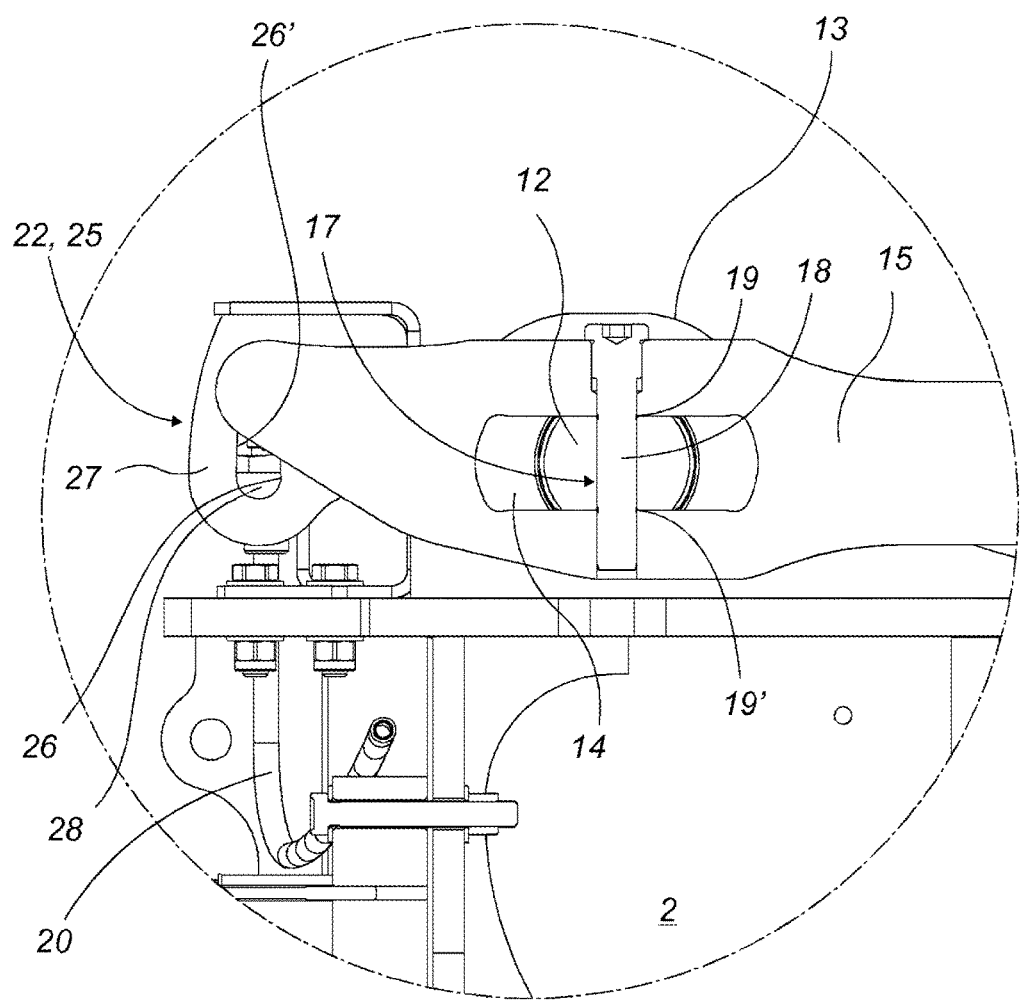
FIG. 5 is a detailed view of the circled portion in FIG. 4.

The structurally and functionally identical elements shown in several different figures are assigned the same numerical or alphanumerical reference.

The system (1) for locking the kingpin of a semi-trailer on a railway unit (2) developed by the applicant comprises a receiving nacelle (3) mounted vertically movable on a railway unit (2) and provided to receive a cowling part mounted through a central opening on the kingpin of a semi-trailer. The vertical movement of the receiving nacelle (3) is ensured by a device comprising means for raising and lowering the nacelle, as well as means for guiding, balancing and/or taking up the stresses thereof. The means for raising and lowering the nacelle for example comprise a jackscrew positioned vertically below the nacelle.

When the semi-trailer is placed on the railway unit (2), its kingpin, equipped with a cowling part, is positioned above the receiving nacelle (3). The receiving nacelle (3) is then moved upward to receive the cowling part that equips the kingpin. This cowling part is then centered, immobilized laterally and longitudinally, and locked vertically by the receiving nacelle (3).

As an example, the receiving nacelle (3) shown in the figures comprises two rows of tilting elements, each including a feeder and the shape of which is studied to ensure a gravitational return to locking of the cowling part.

Although embodiments are described here for a locking system (1) using a receiving nacelle (3), the impact detection device (4) is nevertheless intended for any type of receiving structure (5) of a kingpin, whether the kingpin is received in such a receiving structure (5) via a cowling part or not.

The railway unit (2) is preferably a combined railroad transport wagon for semi-trailers.

The impact detection device (4) comprises a rigid connecting piece (6) satisfying railway solidity standards.

At a first end (7), this rigid connecting piece (6) is mounted articulated by a first articulation (8) to the receiving nacelle (3) or to any other receiving structure (5) of the kingpin of a semi-trailer.

At the second end (9), the rigid connecting piece (6) is connected articulated to the railway unit (2) by a second articulation (10), for example while being mounted articulated on its chassis (11).

Preferably arranged longitudinally with respect to the railway unit (2), the rigid connecting piece (6) takes up the horizontal stresses exerted on the receiving structure (5) by the kingpin of the semi-trailer carried by the railway unit (2) when the kingpin is received in the receiving structure (5).

The second articulation (10) comprises a connecting shaft (12) secured to the railway unit (2) via flanges (13), for example provided at the second end (9) of the rigid connecting piece (6) and mounted pivoting in an oblong (14) provided in the rigid connecting piece (6). This connecting shaft (12) is preferably horizontal and transverse relative to the railway unit (2), while the flanges (13) in which it is mounted rotating are vertical.

The oblong (14) has a sufficient length allowing free spacing between the connecting shaft (12) and the end stops of the oblong (14), so as to allow limited travel D on each side for the connecting shaft (12) when it can move freely in the oblong (14).

According to one preferred embodiment illustrated as an example in the drawings, the rigid connecting piece (6) comprises rigid arms (15), preferably longitudinal, connected by crosspieces (16). There are preferably two rigid arms (15), but there may be more of them. According to this embodiment, each rigid arm (15) is thus mounted articulated to the receiving structure (5) by a first articulation (8) at a first end (7) and mounted articulated to the chassis (11) of the railway unit (2) by a second articulation (10) at a second end (9). Each second articulation (10) then comprises a connecting shaft (12) mounted pivoting in an oblong (14) provided at the second end (9) of each rigid arm (15).

The movement of each connecting shaft (12) in the oblong (14) is prevented by the insertion of a shear pin (17) through each oblong (14) and the connecting shaft (12) that is associated with it. The movement of each connecting shaft (12) is thus blocked by the shear pin (17), but not the pivoting in the oblong (14) that is associated with it, each connecting shaft (12) then preferably being situated in the middle of the oblong (14) that is associated with it, allowing a limited travel D on each side.

The shear pin (17) is provided to break in case of impact exceeding a certain threshold, this impact resulting in a force between each connecting shaft (12) and each oblong (14) and that is experienced by the shear pin (17).

Each shear pin (17) is for example in the form of a threaded rod (18), for example made of steel, inserted vertically through the oblong (14) and the connecting shaft (12), in a through-orifice provided both in the second end (9) of the connecting piece and in the connecting shaft (12). It for example has weak zones, for instance in the form of two circular weakening grooves (19, 19'), provided to break in case of impact exceeding a certain threshold, with a first circular weakening groove (19) provided in the upper part of the oblong (14) and a second circular weakening groove (19') provided in the lower part of the oblong (14).

The diameter and the material of the shear pin (17), as well as the depth, arrangement and number of the weak zones, are calibrated such that the shear pin (17) is only broken in case of impact exceeding a certain threshold, this impact being able to result in potential damage to the kingpin.

The impact detection device (4) also comprises a bypass pipe (20) fastened at the level of the second end (9) of the rigid connecting piece (6) and mounted as a bypass on the general pipe (21), typically pneumatic, that supplies and commands in particular the brakes of the railway unit (2). Such a general pipe (21) typically equips all of the railway wagons.

The bypass pipe (20) of the impact detection device (4) is preferably a semi-rigid bypass pipe (20) made from polyamide.

Part of this bypass pipe (20) is provided in the immediate vicinity of a cutoff tool (22) mounted at the level of the second end (9) of the rigid connecting piece (6), such that when the rigid connecting piece (6) moves in the oblong (14) in which it is kept pivoting, the cutoff tool (22) cuts off the bypass pipe (20).

Of course, the limited travel D must be sufficient to allow the cutoff of the bypass pipe (20) by the cutoff tool (22).

It will be noted that a complete cutoff of the bypass pipe (20) by the cutoff tool (22) is not necessarily required, although desirable, but that a substantial notch in the bypass pipe (20) made by the cutoff tool (22) may suffice for the operation of the impact detection device (4).

The part (23) of the bypass pipe (20) that is provided to be cut off is preferably made from polyamide. Another material can be used if it can be cut off by a steel blade.

The part (23) of the bypass pipe (20) that is provided to be cut off is preferably located near its fastening point (24) on the rigid connecting piece (6).

The cutoff tool (22) preferably assumes the form of a guillotine (25) including two blades (26, 26') each provided in front of and behind the part (23) to be sectioned of the bypass pipe (20) to cut it when the cutoff tool (22) moves longitudinally.

The cutoff tool (22) preferably comprises a plate (27) having an opening (28) for the passage of the part (23) of the bypass pipe (20) provided to be cut off in case of significant impact. The vertical flanks of this opening (28) are each provided with a cutting element, or a blade (26, 26'), for example in the form of a beveled edge, that cuts the bypass pipe (20) when the rigid connecting piece (6) moves longitudinally.

A bypass pipe (20) and an associated cutoff tool (22) are preferably provided on each side of the rigid connecting piece (6), at the level of its second articulation (10).

According to the preferred embodiment where the rigid connecting piece (6) is in the form of two rigid arms (15), a shear pin (17) is provided in the connecting shaft (12) and the oblong (14) of each second articulation (10) of said rigid arms (15), and a bypass pipe (20) and an associated cutoff tool (22) are provided at the level of each of these second articulations (10).

In case of collision of the railway unit (2) including the impact detection device (4), the rigid connecting piece (6) undergoes a longitudinal force that is transmitted both to the kingpin and also to the shear pin (17). If the violence of the impact is likely to damage the kingpin, the shear pin (17) is broken.

If the impact detection device (4) comprises several shear pins (17), bypass pipes (20) and cutoff tools (22), at least one of the shear pins (17) is then broken and the cutoff tool (22) thus moved then cuts off the bypass pipe (20) concerned.

This cutoff of a bypass pipe (20) then causes a leak in the general pipe (21), which causes the activation of the brakes of the railway unit (2). Indeed, these brakes typically use positive security, and any pressure drop in the general pipe (21) causes the activation of the braking, the intensity of which is proportional to the value of the pressure drop in the general pipe (21).

Such an activation of the brakes of the railway unit (2) then immediately warns users while preventing movement of the railway unit (2) transporting a semi-trailer whose kingpin is potentially damaged.

According to one preferred embodiment, the part (23) of the bypass pipe (20) that is provided to be cut off is easily visible from the outside, which allows users to easily identify the railway unit (2) whose bypass pipe (20) has been cut off. In order to stop the leak at the general pipe (21), the impact detection device (4) comprises an isolating tap (29) making it possible to isolate the bypass pipe(s) (20) that have been cut off.

A single isolating tap (29) can be provided for all of the bypass pipes (20) of a same impact detection device (4) or an isolating tap (29) can be provided for each of them.

When the railway unit (2) whose bypass pipe (20) has been cut off has been identified, the users are then informed that the kingpin of the semi-trailer carried by this railway unit (2) is potentially damaged. They then need only to check the integrity thereof, for example on-site by removing the kingpin from the receiving structure (5), or otherwise, by moving the semi-trailer and/or the railway unit (2) in order to be able to check the kingpin later, without delaying the transport of the other railway units hitched to the railway unit (2) in question.

When a shear pin (17) has been broken, the system (1) for locking the kingpin of a semi-trailer on a railway unit (2) remains fully functional. The connecting shaft (12) of the rigid connecting piece (6) is still kept in the oblongs (14), with a slight longitudinal play corresponding to the limited travel D provided on each side in each oblong (14), which does not hinder its operation. The longitudinal movement of each connecting shaft (12) of the second articulation (10) in the oblong (14) that is associated with it, in case the shear pin (17) breaks, remains limited in abutment by the limited travel D.

The limited travel D is provided in front of and behind each connecting shaft (12) of the second articulation (10) such that the impact detection device (4) works equivalently in case of front or rear impact. This is also why the cutoff tool (22) has two blades (26, 26') one provided in front of and one behind the part (23) of the bypass pipe (20) provided to be cut off in case of substantial impact.

To be able to reuse the impact detection device (4), it suffices to replace the shear pin(s) (17) that have been broken, as well as the part of the bypass pipe(s) (20) that have been cut off.

For example, mounted between two couplers (30, 30'), the part (23) of the bypass pipe (20) that is provided to be cut off can be replaced easily.

According to another variant, the rigid connecting piece (6) may also include a protecting device (31) for the receiving structure (5). As illustrated as an example in FIG. 1, this protecting device (31) can assume the form of a tarp (32) mounted pivoting and provided to be able to be pivoted on the receiving structure (5) so as to cover it at least partially in order to protect it from bad weather when the railway unit (2) is not carrying a semi-trailer.

It is obvious that this description is not limited to the examples explicitly described, but that it also includes other embodiments and/or implementations. Thus, one described technical characteristic can be replaced by an equivalent technical characteristic without going beyond the scope of the described embodiments, and one described functional step of implementation of the method can be replaced by an equivalent step without going beyond the scope of the described embodiments as defined by the claims.

For example, although the rigid connecting piece (6) has been shown in the figure connected by both of its ends (7, 9) to the railway unit (2) and to the kingpin receiving structure (5), the rigid connecting piece (6) can of course be connected differently to the railway unit (2) and to the kingpin receiving structure (5) as long as the impacts experienced by the railway unit (2) are transmitted to the rigid connecting piece (6) and the shear pin (17).

Likewise, the orientation of the various means that constitute the impact detection device (4) are shown in the drawings in a configuration making it possible to detect longitudinal impacts, which are the most violent and frequent, in particular during the railway collisions. It is, however, obvious for one skilled in the art to adapt the orientation of these various constituent means to the detection of impacts in another direction.

The invention claimed is:

1. A railway unit on which a semi-trailer is intended to be loaded, which includes a system for locking a kingpin of said semi-trailer comprising a receiving structure provided to receive said kingpin, and which includes a general pipe for supplying fluid supplying and commanding in particular brakes of the railway unit, the railway unit further including an impact detection device comprising the following:
   a rigid connecting piece connected to the receiving structure, impacts experienced by the receiving structure being transmitted to said rigid connecting piece;
   at least one connecting shaft by which the rigid connecting piece is connected to the railway unit, this connecting shaft being mounted on the railway unit, pivotally received in an oblong provided in the rigid connecting piece and able to move in the oblong over a limited travel D provided on each side in the oblong;
   at least one shear pin inserted through the connecting shaft and the oblong that prevents the connecting shaft from moving in the oblong, this shear pin being provided to break in case of impact exceeding a certain threshold and then allowing the connecting shaft to move in the oblong;
   at least one bypass pipe mounted as a bypass on the general pipe of the railway unit, this bypass pipe being secured to the rigid connecting piece;
   at least one cutoff tool secured to the railway unit, which cuts off a part of the bypass pipe when the shear pin is broken and the connecting shaft is moving in the oblong associated with the connecting shaft.

2. The railway unit according to claim 1, wherein the rigid connecting piece comprises rigid arms connected to the receiving structure, each rigid arm further being connected to the railway unit by a connecting shaft of said at least one connecting shaft mounted on the railway unit, this connecting shaft being pivotally received in the oblong, each oblong being provided in a respective one of each provided in each rigid arm and able to move in this oblong over a limited travel D provided on either side in the oblong, and in that a shear pin of the at least one shear pin is inserted through the oblong of each rigid arm and the connecting shaft that is associated with the rigid arm.

3. The railway unit according to claim 2, wherein each rigid arm is associated with a respective said shear pin, a bypass pipe of said at least one bypass pipe and a cutoff tool of said at least one cutoff tool that are separate from those of another said rigid arm.

4. The railway unit according to claim 1, wherein each connecting shaft is horizontal and transverse relative to the railway unit, and in that the rigid connecting piece extends longitudinally relative to the railway unit.

5. The railway unit according to claim 1, wherein the rigid connecting piece is mounted articulated on the receiving structure at a level of a first end.

6. The railway unit according to claim 1, wherein the rigid connecting piece is mounted articulated on the railway unit at a level of a second end.

7. The railway unit according to claim 1, wherein each shear pin is in the form of a threaded rod.

8. The railway unit according to claim 7, wherein each shear pin includes a first circular weakening groove provided in an upper part of the oblong and a second circular weakening groove provided in a lower part of the oblong.

9. The railway unit according to claim 1, wherein each bypass pipe is a semi-rigid bypass pipe.

10. The railway unit according to claim 1, wherein the part of each bypass pipe provided to be cut off is located in the immediate vicinity of an associated cutoff tool of said at least one cutoff tool which assumes the form of a guillotine having two blades provided one in front of and one behind the part of the bypass pipe to be cut off.

11. The railway unit according to claim 1, wherein each cutoff tool comprises a plate having an opening for the passage of the part of the bypass pipe provided to be cut off, vertical flanks of this opening being provided with a cutting element that cuts the bypass pipe when the rigid connecting piece moves longitudinally.

12. The railway unit according to claim 1, wherein a bypass pipe of said at least one bypass pipe and an associated cutoff tool of said at least one cutoff tool are provided on each side of the part by which the rigid connecting piece is connected to the railway unit.

13. The railway unit according to claim 1, further comprising an isolating tap making it possible to isolate the bypass pipe relative to the general pipe.

14. The railway unit according to claim 1, wherein the rigid connecting piece includes a protecting device for the receiving structure.

15. The railway unit according to claim 14, wherein the protecting device comprises a tarp pivotally mounted and provided to be able to be pivoted over the receiving structure to cover the receiving structure at least partially when no semi-trailer is loaded on the railway unit.

16. The railway unit according to claim 7, wherein each shear pin is in the form of a threaded rod having weak zones provided to break in case of impact exceeding a certain threshold.

* * * * *